Wm. C. Shaw — Process of and Apparatus for Separating, Concentrating and Amalgamating Ores and Minerals.
No. 116763. Patented Jul 4 1871.
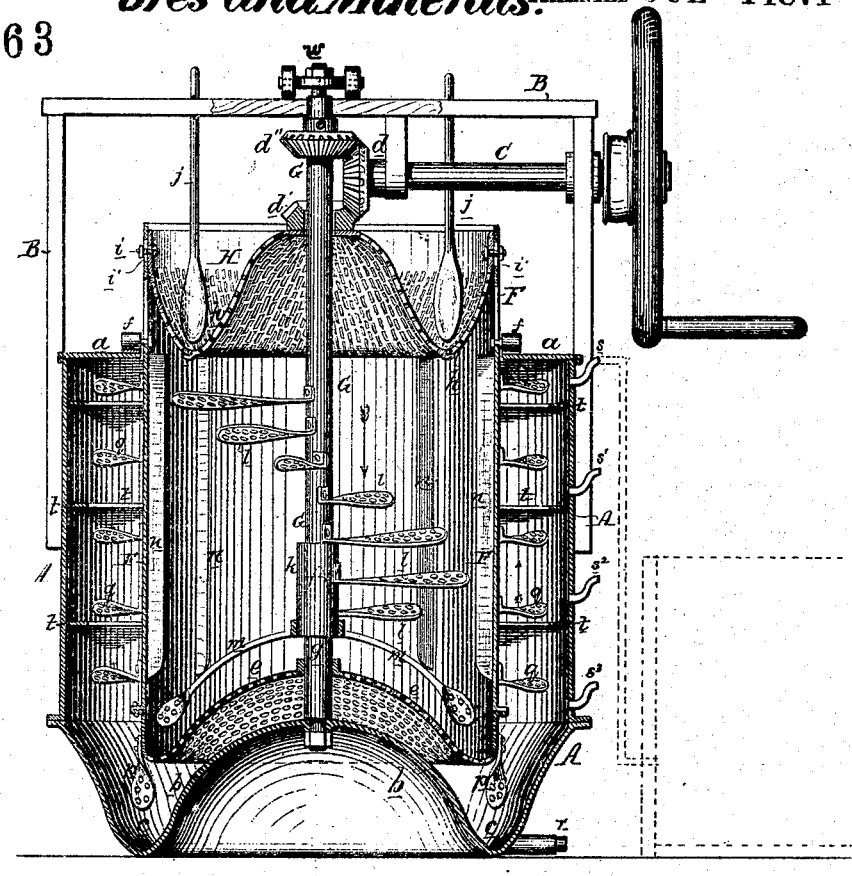
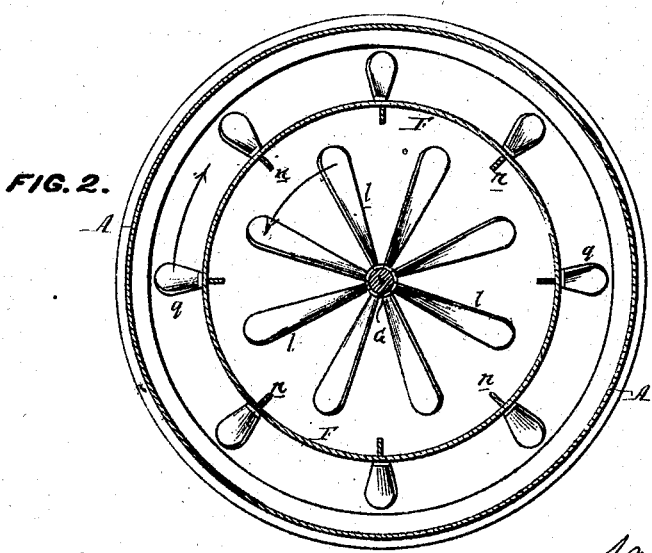
WITNESSES: Jno. B. Harding, John Parker
W. C. Shaw
by his Attys

UNITED STATES PATENT OFFICE.

WILLIAM CROWTHER SHAW, OF PHILADELPHIA, PENNSYLVANIA.

IMPROVEMENT IN APPARATUS AND PROCESSES FOR SEPARATING, CONCENTRATING, AND AMALGAMATING ORES.

Specification forming part of Letters Patent No. 116,763, dated July 4, 1871.

*To all whom it may concern:*

Be it known that I, WILLIAM CROWTHER SHAW, of Philadelphia, county of Philadelphia, State of Pennsylvania, have invented a process of and apparatus for separating, concentrating, and amalgamating ores and minerals, of which the following is a specification:

My invention consists, first, of a process, fully described hereafter, of treating ores and minerals by mixing the same with water, and causing the mass to pass gradually downward to the bottom of a vessel or chamber, while being overturned and agitated, and to then pass upward through another chamber, or through tubes or channels, to the point or points of discharge; and my invention consists, secondly, of a peculiar apparatus, fully described hereafter, by which the said process may be carried into effect.

Figure 1 is a vertical sectional view of my improved apparatus for separating, concentrating, and amalgamating ores and minerals; Fig. 2, a sectional plan view of the same on the line 1 2, Fig. 2; and Fig. 3, a detached view.

A represents the outer cylindrical casing of the apparatus, of wood or metal, and supported in any suitable manner. This casing has a flat cover, $a$, and a bottom curved in the peculiar manner shown in Fig. 1, so as to form a semi-cylindrical projection, $b$, in the center, and a deep angular depression, $c$, surrounding the said projection. The casing A supports a light frame, B, in which are formed bearings for a horizontal driving-shaft, C, furnished at its inner end with a bevel-wheel, $d$, gearing into two similar wheels, $d^1$ and $d^2$, the former of which is secured to a revolving casing or vessel, F, and the latter to a vertical shaft, G, which passes downward through the center of the said revolving vessel. The vessel F has a perforated and curved bottom, $e$, corresponding nearly in shape to the bottom of the outer casing A; and the said vessel is supported by and turns upon rollers $f$, which rest upon the cover $a$ of the outer casing, the vessel being also steadied and maintained in a central position by the shaft G, and by a rod or step, $g$, which is secured to the semicircular projection B of the outer casing, and extends upward through the perforated bottom of the vessel. The bevel-wheel $d^1$, through the medium of which the vessel F is rotated, is secured to a perforated hopper or sieve, H, in which is formed a deep annular depression, $h$, the sieve in fact corresponding nearly in shape to the curved bottom of the outer casing, and being secured to the sides of the vessel F by bolts $i$, adapted to slots $i'$ cut in the said vessel, the object of this arrangement being to enable the latter to be adjusted toward or from the bottom of the outer casing, as hereafter described, without throwing the bevel-wheel $d^1$ out of gear, the supporting-rollers $f$ being also capable of vertical adjustment in the slotted sides of the vessel in order to permit such raising and lowering of the latter. Two or more arms or scrapers, $j$, are secured to the frame B, and extend downward into the deep annular depression $h$ of the hopper H for the purpose of agitating and overturning the material contained in the latter; and the said hopper has oblong instead of circular perforations, and is cast in a number of radial sections joined together at the sides and at the lowest point of the annular depression $h$, this method of construction enabling any portion of the hopper to be removed when worn out or broken without involving the necessity of replacing the whole, and also enabling the hopper to be entirely removed and replaced by another having finer or coarser perforations. The shaft G is suspended from the frame B by an anti-friction device, $w$, consisting of a plate, to which are hung two rollers turning upon the top of the said frame; and the shaft has at its lower end a socket, $k$, Fig. 3, which fits over and turns upon the rod $g$ before referred to, this preventing any lateral vibration of the said shaft. A number of curved and perforated blades, $l$, is secured radially to the shaft G within the vessel F; and the said shaft has also secured to it, beneath these blades, two or more curved arms, $m$, which extend into the annular depression formed at the bottom of the said vessel, the latter also being provided on the inside with vertical wings $n$. Into the deep annular depression $c$ of the outer casing project wings or blades $p$ of the inner revolving vessel, and the latter is also provided on its exterior with a number of blades, $q$, inclined in a direction opposite to the blades of the shaft G, so that they will have a tendency to elevate any material that may be contained between the two casings. The outer casing is provided at the bottom with an outlet-pipe, $r$, and other outlet-pipes $s$, $s^1$, $s^2$, &c., are arranged at different heights in the sides of the same. There is, also, within and extending around the sides of the outer casing, a number of projecting rings or collars, $t$.

For the purpose of concentrating and of separating gold and other metals from earth, sand, and other impurities, the operation of the apparatus is as follows: The mass to be treated is introduced into the annular perforated hopper H with a proper quantity of water, the said hopper, with the inner casing and the shaft G, being rotated in opposite directions by means of the gearing before described. The object in making the perforations in the hopper oblong instead of circular is to prevent the clogging of the same by small pebbles and particles of sand. All but the coarsest particles in the mass will be caused to pass through the oblong perforations of the hopper, by the fixed arms $j$, into the interior of the inner casing, in which the mass, as it accumulates, will be forced downward by the blades of the revolving shaft and wings $n$ of the vessel, and will be thoroughly overturned and agitated, and be again sifted through the perforated bottom of the inner vessel before passing into the outer casing. The thorough agitation and overturning to which the mass is thus subjected will enable the gold or other heavy particles to gravitate to the lowest point of the apparatus, and accumulate in the deep annular space $c$ between the bottoms of the two casings. In this space or depression $c$ the concentrated mass will be still further agitated by the blades $p$, and, the pressure from above being still continued, the lighter particles or the greater portion of the whole mass will be forced upward between the two casings. The rings or collars $t$ and blades $q$ will aid in thus raising the material, and will have the effect of still further agitating and overturning the whole mass, so that heavy particles may still be disengaged and permitted to descend. The lighter portions of the mass which are thus raised and floated up with the water are discharged from the apparatus through either of the pipes $s$, $s^1$, $s^2$, or $s^3$, as may be found most expedient, and the heavier portions, containing the gold or other metal which has been separated from the mass, are withdrawn from time to time through the discharge-pipe $r$.

The inner vessel F is arranged, as before described, so that it can be adjusted vertically from or toward the bottom of the outer casing A; and the bottoms of the two vessels are made of the same curved form as shown in Fig. 1, and are to be formed with teeth or grinding-surfaces, so that they may, in treating some materials, be brought close together for the purpose of grinding and reducing the said materials in their passage through the apparatus.

In using the apparatus as an amalgamator the operation is the same as above described, excepting that a quantity of mercury is placed in the space $c$ to take up the particles of metal.

The apparatus, however, is not confined to the treatment of earths or ores containing metals, for the purpose of separating the latter, as it can be used with advantage in separating the fine from the coarser particles of a variety of minerals, such as chalk, baryta, &c. In treating such minerals the apparatus is operated precisely as before described, excepting that a somewhat greater quantity of water may be used. The specific gravity of the coarsest particles being the greatest, such particles will, as the mass is agitated, gravitate toward the bottom of the apparatus, while the finer particles will be "floated" upward with the water toward the top of the space between the two casings, and can be drawn off through the uppermost of the pipes $s$, those particles which are drawn off through the uppermost pipe being the finest, and the product becoming coarser as the bottom of the apparatus is approached.

Where it is desirable to obtain a product of exceeding fineness the mass which is drawn off through the uppermost pipe $s$ may be treated with more water, and be passed through another similar apparatus, or through any vessel or vessels in which it can be caused to descend to the bottom, and to then rise gradually toward the top while being agitated for the purpose of settling the coarse and heavy particles.

It is not absolutely necessary, in carrying out my invention, that the apparatus should be constructed precisely as above described. The shaft G, for instance, might be continuous, and have a bearing in the bottom of the outer casing, instead of being arranged as above described. In some cases, also, the inner casing might be stationary, and the outer casing be caused to revolve; or both might be rotated; or a reciprocating motion might be imparted to either or both, or the inner casing might be dispensed with, and the outer casing be provided with channels or tubes, through which to conduct the lighter particles upward to the discharge-orifices after the whole mass has been caused to descend to the bottom of the apparatus.

I claim—

1. The within-described process of treating ores and minerals—that is to say, mixing the same with water and causing the mass to pass gradually downward to the bottom of a vessel or chamber while being overturned and agitated, and to then pass upward through another chamber, or through tubes or channels, to the point or points of discharge.

2. An apparatus for treating ores or minerals, in which are combined two casings, A and F, and a shaft, G, the said casings and shaft being armed with agitators and blades, arranged and operating substantially as herein described.

3. The perforated top H of the inner casing F of the apparatus, when curved in the peculiar manner described, so as to form an annular recess or hopper, $h$, for the purpose specified.

4. The said annular hopper H, formed with oblong perforations, and consisting of a number of radial plates bolted together and to the casing F, substantially as specified.

5. The combination of the said hopper with the arms $j$ affixed to the frame B.

6. The perforated and curved bottom $e$ of the inner casing, arranged in respect to the similarly-curved bottom of the outer casing, and having blades $p$ extending into and arranged to revolve in the said outer casing, all substantially as specified.

7. The combination of the curved bottoms of the inner and outer casings, when formed with a grinding-surface or surfaces, and arranged to be adjusted from or toward each other, substantially as herein set forth.

8. The combination of the blades $q$ of the inner casing with the rings or collars $t$ of the outer casing.

9. The arrangement, substantially as described, of the outlet-passages $s$, $s^1$, $s^2$, and $s^3$ in the outer casing.

10. The combination of the within-described apparatus with another similar apparatus, or with a vessel or vessels in which a mass of ore or mineral can be treated, substantially in the manner described.

In testimony whereof I have signed my name to this specification in the presence of two subscribing witnesses.

W. C. SHAW.

Witnesses:
WM. A. STEEL,
FRANKLIN B. RICHARDS.